US012728563B2

(12) United States Patent
Gonzalez et al.

(10) Patent No.: US 12,728,563 B2
(45) Date of Patent: Sep. 8, 2026

(54) APPARATUS AND METHODS FOR PRESSURE CASTING USING AN INDIRECT FEED

(71) Applicant: James R. Glidewell Dental Ceramics, Inc., Newport Beach, CA (US)

(72) Inventors: Hugo Gonzalez, Whittier, CA (US); Mathew Campbell, Lake Elsinore, CA (US); Alonso E. Delgado, Long Beach, CA (US); Sreeram Balasubramanian, Irvine, CA (US)

(73) Assignee: James R. Glidewell Dental Ceramics, Inc., Newport Beach, CA (US)

( * ) Notice: Subject to any disclaimer, the term of this patent is extended or adjusted under 35 U.S.C. 154(b) by 53 days.

(21) Appl. No.: 18/990,853

(22) Filed: Dec. 20, 2024

(65) Prior Publication Data

US 2025/0205926 A1 Jun. 26, 2025

Related U.S. Application Data

(60) Provisional application No. 63/614,250, filed on Dec. 22, 2023.

(51) Int. Cl.
*B28B 1/26* (2006.01)
*B28B 13/02* (2006.01)

(52) U.S. Cl.
CPC .............. *B28B 1/261* (2013.01); *B28B 13/02* (2013.01)

(58) Field of Classification Search
CPC .......... B28B 1/261; B28B 1/263; B28B 13/02
See application file for complete search history.

(56) References Cited

U.S. PATENT DOCUMENTS

| | | | |
|---|---|---|---|
| 399,064 | A | 3/1889 | Mclean et al. |
| 3,111,396 | A | 11/1963 | Ball |
| 3,523,916 | A | 8/1970 | Needham et al. |
| 3,837,825 | A | 9/1974 | Loxley et al. |
| 4,431,420 | A | 2/1984 | Adair |
| 4,556,530 | A | 12/1985 | van der Scheer et al. |
| 4,769,349 | A | 9/1988 | Hillig et al. |
| 4,772,436 | A | 9/1988 | Tyszblat |

(Continued)

FOREIGN PATENT DOCUMENTS

| | | | |
|---|---|---|---|
| CN | 1215711 | A | 5/1999 |
| CN | 1236761 | A | 12/1999 |

(Continued)

OTHER PUBLICATIONS https://www.utube.com/watch?v=N4wg_trJ-PK (Year: 2011).

(Continued)

*Primary Examiner* — James Sanders
(74) *Attorney, Agent, or Firm* — Klarquist Sparkman, LLP

(57) ABSTRACT

This disclosure is directed to an apparatus comprising a manifold removably coupled to a mold, wherein ceramic slurry is indirectly fed into the cavity of the mold. More specifically, ceramic slurry is directly fed into an exterior portion of the mold and subsequently indirectly fed into the mold cavity. In certain aspects, the mold cavity can further comprise one or more inserts for producing ceramic articles having smaller dimensions and/or of irregular shape by casting by using a two-directional ceramic slurry feed. In some aspects, excess ceramic slurry from the casting process can be recycled for subsequent runs via a pitch. Also disclosed herein is a method for pressure casting using an indirect feed.

8 Claims, 8 Drawing Sheets

(56) References Cited

U.S. PATENT DOCUMENTS

| | | | |
|---|---|---|---|
| 4,828,495 | A | 5/1989 | Bell et al. |
| 4,906,424 | A | 3/1990 | Hughes et al. |
| 4,913,640 | A | 4/1990 | Spieler et al. |
| 4,913,868 | A | 4/1990 | Ito et al. |
| 4,983,182 | A | 1/1991 | Kijima et al. |
| 5,083,911 | A | 1/1992 | Hisaeda et al. |
| 5,156,856 | A | 10/1992 | Iwasaki et al. |
| 5,167,271 | A | 12/1992 | Lange et al. |
| 5,185,177 | A | 2/1993 | Kijima et al. |
| 5,192,325 | A | 3/1993 | Kijima et al. |
| 5,203,936 | A | 4/1993 | Dolhert et al. |
| 5,256,609 | A | 10/1993 | Dolhert |
| 5,296,175 | A | 3/1994 | Iwasaki et al. |
| 5,336,282 | A | 8/1994 | Ghosh et al. |
| 5,342,564 | A | 8/1994 | Wei et al. |
| 5,372,178 | A | 12/1994 | Claar et al. |
| 5,395,437 | A | 3/1995 | Chiou |
| 5,427,722 | A | 6/1995 | Fouts et al. |
| 5,441,408 | A | 8/1995 | Moschik |
| 5,443,770 | A | 8/1995 | Krstic et al. |
| 5,567,366 | A | 10/1996 | Motegi et al. |
| 5,660,863 | A | 8/1997 | Nakano et al. |
| 5,672,055 | A | 9/1997 | Koutavas |
| 5,776,382 | A | 7/1998 | Kim et al. |
| 5,785,911 | A | 7/1998 | Willkens et al. |
| 5,788,891 | A | 8/1998 | Gauckler et al. |
| 5,843,348 | A | 12/1998 | Giordano |
| 5,849,068 | A | 12/1998 | Hofmann et al. |
| 5,975,905 | A | 11/1999 | Kim et al. |
| 6,007,926 | A | 12/1999 | Provenzano et al. |
| 6,180,034 | B1 | 1/2001 | Buck et al. |
| 6,200,526 | B1 | 3/2001 | Fox et al. |
| 6,257,546 | B1 | 7/2001 | Deakin et al. |
| 6,291,378 | B1 | 9/2001 | Evans et al. |
| 6,431,800 | B1 | 8/2002 | Susuki |
| 6,814,917 | B1 | 11/2004 | Watanabe et al. |
| 6,878,456 | B2 | 4/2005 | Castro et al. |
| 6,896,846 | B1 | 5/2005 | Varma et al. |
| 6,946,013 | B2 | 9/2005 | Alward et al. |
| 7,271,100 | B2 | 9/2007 | Lee et al. |
| 7,655,586 | B1 | 2/2010 | Brodkin et al. |
| 8,178,012 | B1 | 5/2012 | Khan et al. |
| 8,196,755 | B2 | 6/2012 | Diefenbacher et al. |
| 8,268,230 | B2 | 9/2012 | Cherepy et al. |
| 8,572,484 | B2 | 10/2013 | Maruyama et al. |
| 8,785,518 | B2 | 7/2014 | Suh et al. |
| 8,813,364 | B2 | 8/2014 | Schechner et al. |
| 9,039,947 | B2 | 5/2015 | Jahns et al. |
| 9,193,630 | B2 | 11/2015 | Bocciarelli et al. |
| 9,309,155 | B2 | 4/2016 | Nahas |
| 9,434,651 | B2 | 9/2016 | Carden |
| 9,790,125 | B2 | 10/2017 | Beall et al. |
| 9,790,129 | B2 | 10/2017 | Carden |
| 9,925,126 | B2 | 3/2018 | Kolb et al. |
| 11,305,457 | B2 | 4/2022 | Gonzalez et al. |
| 11,731,312 | B2 | 8/2023 | Kim et al. |
| 12,304,106 | B2 | 5/2025 | Gonzalez et al. |
| 2001/0048969 | A1 | 12/2001 | Constantino et al. |
| 2002/0037800 | A1 | 3/2002 | Yang |
| 2002/0155412 | A1 | 10/2002 | Panzera et al. |
| 2003/0096214 | A1 | 5/2003 | Luthardt et al. |
| 2003/0203063 | A1 | 10/2003 | Ano |
| 2004/0119180 | A1 | 6/2004 | Frank et al. |
| 2005/0023710 | A1 | 2/2005 | Brodkin et al. |
| 2005/0203231 | A1 | 9/2005 | Halpert et al. |
| 2006/0014390 | A1 | 1/2006 | Lee et al. |
| 2007/0056467 | A1 | 3/2007 | Panzera |
| 2007/0134496 | A1 | 6/2007 | Katagiri et al. |
| 2007/0160705 | A1 | 7/2007 | Lee |
| 2008/0085828 | A1 | 4/2008 | Khan et al. |
| 2008/0164402 | A1 | 7/2008 | Menke et al. |
| 2008/0258358 | A1 | 10/2008 | Oswald et al. |
| 2009/0098365 | A1 | 4/2009 | Moeltgen |
| 2009/0115084 | A1 | 5/2009 | Moon |
| 2009/0220787 | A1 | 9/2009 | Bernard-Granger et al. |
| 2009/0291011 | A1 | 11/2009 | Zhang et al. |
| 2009/0321971 | A1 | 12/2009 | Brodkin et al. |
| 2010/0003157 | A1 | 1/2010 | Scholl et al. |
| 2010/0249305 | A1 | 9/2010 | Laubersheimer et al. |
| 2011/0236860 | A1 | 9/2011 | Jahns et al. |
| 2011/0260349 | A1 | 10/2011 | Rolf et al. |
| 2012/0193823 | A1 | 8/2012 | Goetzinger et al. |
| 2013/0224454 | A1 | 8/2013 | Jung et al. |
| 2013/0224688 | A1 | 8/2013 | Mayr et al. |
| 2013/0313738 | A1 | 11/2013 | Carden |
| 2013/0341812 | A1 | 12/2013 | Schechner et al. |
| 2014/0008826 | A1 | 1/2014 | Dierks et al. |
| 2014/0370291 | A1 | 12/2014 | Rodriguez et al. |
| 2018/0170812 | A1 | 6/2018 | Xu et al. |
| 2018/0206953 | A1 | 7/2018 | Doviack et al. |
| 2019/0127284 | A1 | 5/2019 | Balasubramanian et al. |
| 2019/0134848 | A1 | 5/2019 | Podgorski et al. |

FOREIGN PATENT DOCUMENTS

| | | | |
|---|---|---|---|
| DE | 1471423 | A1 | 7/1963 |
| DE | 102014221945 | A1 | 4/2016 |
| EP | 0329284 | B1 | 9/1992 |
| EP | 0587160 | A1 | 3/1994 |
| EP | 0561613 | B1 | 11/1994 |
| EP | 1944145 | A2 | 7/2008 |
| EP | 2774903 | A1 | 10/2012 |
| EP | 2531333 | B1 | 2/2014 |
| GB | 1295055 | | 11/1972 |
| GB | 1342890 | A | 1/1974 |
| GB | 2194751 | A | 3/1988 |
| GB | 2372958 | B | 10/2004 |
| JP | 411019910 | A | 1/1999 |
| WO | 2006024098 | A1 | 3/2006 |
| WO | 2007000310 | A1 | 1/2007 |
| WO | 2009061410 | A1 | 5/2009 |
| WO | 2013181018 | A2 | 12/2013 |

OTHER PUBLICATIONS

Written opinion of the International Searching Authority for PCT/US2008/012489, Dec. 31, 2008, in 4 pages.

International Search Report issued in Application No. PCTUS2008/12489 dated Dec. 31, 2008.

International Search report in International Application No. PCT/US2013/041941 mailed Oct. 24, 2013.

U.S.P.T.O Non-final Office Action issued in U.S. Appl. No. 12/290,089 dated Jun. 2, 2009.

U.S.P.T.O Non-final Office Action issued in U.S. Appl. No. 12/290,089 dated Dec. 1, 2009.

Non-Final Office Action issued in U.S. Appl. No. 13/481,810 dated Jan. 15, 2016.

Final Office Action issued in U.S. Appl. No. 13/481,810 dated Sep. 22, 2015.

Non-Final Office Action issued in U.S. Appl. No. 13/481,810 dated Mar. 12, 2015.

Non-Final Office Action issued in U.S. Appl. No. 13/481,810 dated Aug. 22, 2014.

International Supplementary Search Report issued for PCT/US2008/012489, Feb. 16, 2018, in 10 pages.

APPARATUS AND METHODS FOR PRESSURE CASTING USING AN INDIRECT FEED

CROSS REFERENCE TO RELATED APPLICATION

This application claims the benefit of and priority to U.S. Provisional Patent Application No. 63/614,250, filed Dec. 22, 2023, which is incorporated herein by reference in its entirety.

FIELD

The present disclosure concerns an apparatus and methods for producing ceramic articles by pressure casting using an indirect feed.

BACKGROUND

Traditionally, ceramic articles made via press casting involve the use of binders in forming the final product. However, during the press casting process, binders are removed at high temperatures creating voids in the final product and less dense products. To avoid press casting, slip casting has also been used in making ceramic articles; however, slip casting can take approximately eight hours to cast a sixteen-millimeter block and three days to dry, which limit the dimensions of the final product.

Conventional pressure casting, which is commonly used in making large sanitary articles, can decrease slip casting process time. In conventional pressure casting, ceramic slurry is directly injected into the mold cavity and thereby fill the mold cavity with ceramic slurry. After the cavity of the mold has been filled, pressure is applied from the outer most layers of the ceramic slurry in the cavity towards the inner layers of the ceramic slurry in the cavity of the mold (i.e., one directional pressure casting) and thereby produce a cast body. However, the direct injection of ceramic slurry into the mold cavity causes defects in the cast body such as cracking and uneven surfaces. Moreover, conventional pressure casting is limited to large ceramic articles (e.g., sinks, bathtubs, toilet bowls) and cannot produce small ceramic articles and/or ceramic articles having an irregular shape.

Therefore, there is a need in the art for new devices and systems with facile handling and methods that will reduce the amount of casting time to produce small ceramic articles of different and/or irregular shapes without cracking and uneven surfaces.

SUMMARY

The present disclosure provides for an apparatus for pressure casting ceramic articles having complex shapes using an indirect ceramic slurry feed and a two-directional ceramic slurry feed.

Certain disclosed aspects concern an apparatus comprising a manifold removably coupled to one or more molds comprising a cavity for indirectly receiving ceramic slurry. The mold having an impermeable surface and the manifold comprising one or more feed holes configured to directly deliver ceramic slurry to an exterior portion of the impermeable mold surface, wherein the ceramic slurry flows into the cavity after being directly delivered to the exterior portion of the impermeable mold surface. Although variable, the manifold typically comprises one or more wells having a first open end and a second closed end, the second end comprising the one or more feed holes. The second closed end comprising the one or more feed holes at an end portion of the one or more wells. The mold typically has a surface that joins a first open end to a second open end at a fixed distance. In certain aspects, the first open end and second open end are joined by a curved surface to form a hollow cylinder comprising a circular first open end and a circular second open end. Such molds typically comprise a bottom portion of the surface is configured to rest on top of the one or more feed holes.

In particular disclosed aspects, the apparatus may further comprise a porous membrane removably attached to the first open end of the one or more molds. In certain aspects, the manifolds typically comprise one or more channels in direct communication with the one or more feed holes. In aspects disclosed herein, the apparatus may further comprise an insert comprising one or more passages, wherein the insert is configured to be included within the cavity of the mold and are in direct communication with the cavity of the one or more molds. In certain aspects, the apparatus may comprise a center portion of the second closed end of the one or more wells forms a conical shape and slopes downwards towards the outer portion to form a pitch. The pitch typically slopes downward into the one or more feed holes.

Also disclosed herein is a method for pressure casting ceramic articles having complex shapes using an indirect feed and a two-directional ceramic slurry feed. The method generally comprising: providing an apparatus comprising a manifold comprising one or more feed holes in direct communication with one or more channels, and the manifold removably coupled to one or more molds comprising a cavity, a first open end and a second open end joined by a surface, wherein a bottom portion of the surface is configured to rest on top of the one or more feed holes, and wherein a porous membrane is removably attached to the first open end of the mold; providing a ceramic slurry, wherein the cavity is indirectly filled with the ceramic slurry after the feed hole directly delivers ceramic slurry to an exterior bottom portion of the surface; indirectly filling the cavity; directly filling channels with the ceramic slurry; applying a pressure to the ceramic slurry to remove a liquid component of the ceramic slurry via the porous membrane and consolidate ceramic particles to form a cast body within the cavity of the removably coupled mold; and ejecting the removably coupled mold comprising the cast body. The method typically comprises applying a pressure comprising a range of greater than 0 bar to 60 bar, preferably from 10 bar to 50 bar, and most preferably from 30 bar to 40 bar. In certain aspects, the method is configured to produce one or more cast bodies having a thickness in the range of 0 mm to 60 mm, preferably between 10 mm to 45 mm, and most preferably between 15 mm to 35 mm, which can be produced in a time range of 40 minutes to 120 minutes.

In certain aspects, the method may further comprise providing an insert comprising one or more passages into the cavity of the one or more molds, wherein the ceramic slurry is indirectly delivered to the passages, and thereby fills the cavity, the one or more channels, and the one or more passages to produce a stem cast body. Typically, a pressure from greater than 0 bar to 60 bar is applied, preferably from 10 bar to 50 bar, and most preferably from 10 bar to 15 bar is applied. In some aspects, the method can be configured to produce one or more cast bodies having a height in the range of 15 millimeter to 25 millimeter and is produced in a time range of 70 minutes to 100 minutes. The stem cast body typically has a length in the range of 10 millimeter to 15 millimeter and is produced in a time range of 95 minutes to 115 minutes. In certain aspects, the method further comprises recycling the excess ceramic slurry via a pitch. In such aspects, a vacuum is configured to the one or more channels to apply a negative pressure and thereby extract the excess slurry into a holding tank.

The foregoing and other objects, features, and advantages of the present disclosure will become more apparent from the following detailed description, which proceeds with reference to the accompanying figures.

DETAILED DESCRIPTION

Figure 1:
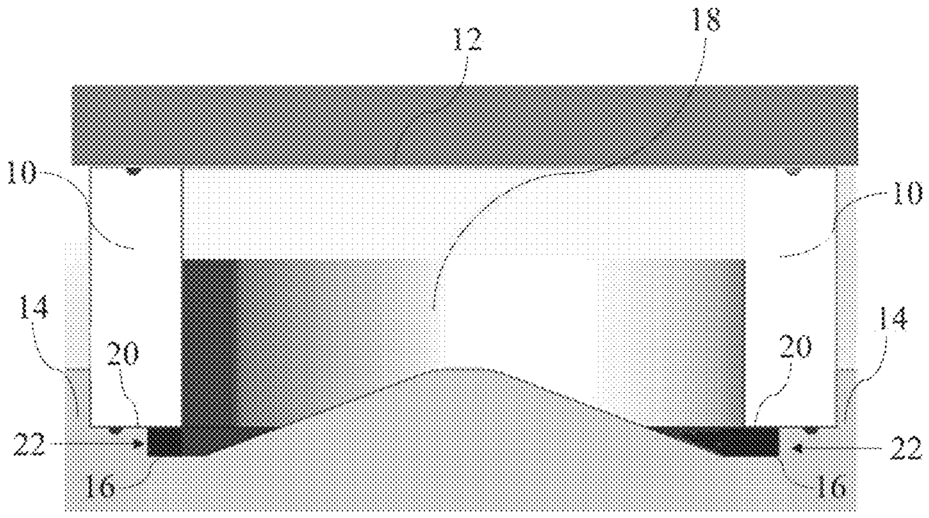
FIG. 1 is a schematic illustrating an aspect of the apparatus according to the present disclosure comprising a manifold that is removably coupled to at least one mold comprising a cavity configured for indirectly receiving ceramic slurry.

For purposes of this description, certain aspects, advantages, and novel features of the embodiments of this disclosure are described herein. The disclosed systems and methods should not be construed as being limiting in any way. Instead, the present disclosure is directed toward all novel and nonobvious features and aspects of the various disclosed embodiments, alone and in various combinations and subcombinations with one another. The systems and methods are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

All features described herein are independent of one another and, except where structurally impossible, can be used in combination with any other feature described herein.

As used in this application and in the claims, the singular forms "a," "an," and "the" include the plural forms unless the context clearly dictates otherwise. Additionally, the term "includes" means "comprises." Further, the term "coupled" generally means physically, mechanically, chemically, magnetically, and/or electrically coupled or linked and does not exclude the presence of intermediate elements between the coupled or associated items absent specific contrary language.

In the description, certain terms may be used such as "up," "down," "upper," "lower," "horizontal," "vertical," "left," "right," and the like. These terms are used, where applicable, to provide some clarity of description when dealing with relative relationships. However, these terms are not intended to imply absolute relationships, positions, and/or orientations. For example, with respect to an object, an "upper" surface can become a "lower" surface simply by turning the object over. Nevertheless, it is still the same object.

As used herein, the terms "attached" and "coupled" generally mean physically connected or linked, which includes items that are directly attached/coupled and items that are attached/coupled with intermediate elements between the attached/coupled items, unless specifically stated to the contrary.

In contrast, the terms "removably attached" or "removably coupled" refer to two components joined in a manner such that the components can be readily separated from another to return to their separate, discrete forms without destroying and/or damaging one or both of the components. Exemplary modalities of temporary attachment can include mating-type connections, releasable fasteners, removable stiches, screw or threaded connections, snap-fit connections, and or other temporary joining techniques.

To facilitate review of the various aspects of the disclosure, the following explanations of specific terms are provided.

Ceramic Slurry: refers generally to a slurry comprising ceramic materials suitable for use in manufacturing dental restorations, such as, but not limited to, crowns veneers, bridges, dentures. Ceramic slurries may include, but are not limited to, alumina, zirconia, boron carbide, silicon carbide, spinel, barium titrate, and the like, combinations thereof. In some particular aspects of the present disclosure, ceramic slurries comprising zirconia ceramic material may comprise stabilized, partially stabilized, or fully stabilized zirconia ceramic material. In some aspects, zirconia powders may include yttria-stabilized zirconia, that has been stabilized with 0.1 mol % to 8 mol % yttria, such as 2 mol % to 7 mol % yttria, or 2 mol % to 4 mol % yttria, or 4 mol % to 6 mol % yttria. For example, yttria-stabilized zirconia commercially available from Tosoh USA, such as Tosoh TZ-3YS (comprising 3 mole % yttria, or 3Y), Tosoh PX485 (comprising 4 mol % yttria, or 4Y), and Tosoh PX430 (comprising 5 mol % to 6 mol % yttria, such as 5.5Y). Commercially available zirconia powder may have a measured particle size D(50) of about 60 nm or more, which constitute agglomerations of particles of crystallites having an actual particle size of about 20 nm to 40 nm. In particular aspects disclosed herein, the zirconia powders may include yttria-stabilized zirconia that has been stabilized with 0.1 mol % to 8 mol % yttria, such as 2 mol % to 7 mol % yttria, or 2 mol % to 4 mol % yttria, or 4 mol % to 6 mol % yttria. For example, yttria-stabilized zirconia powders can include yttria-stabilized zirconia commercially available from Inframat Corporation, USA, such as 4039ON-9501, 4039ON-9502 (comprising 3 mol % yttria, or 3Y), 4039ON-8601 (comprising 8 mol % yttria, or 8Y), or mixtures thereof. Yttria-stabilized zirconia powders may include alumina at a concentration of 0 wt. % to 0.25 wt. %, such as 0.1 wt. %, relative to the zirconia powder. In some aspects, additives can be added to the ceramic slurry including coloring agents and esthetic additives, such as metal oxides and metal salts, or other metal-containing compounds used to obtain dentally acceptable shades in final sintered restorations. In some aspects, further processing aids such as, but not limited to, binders and dispersants can be added to the ceramic slurry.

Dispersant: refers generally to a compound that promotes dispersion and stability of the slurry, and controls the viscosity of the ceramic slurry where dispersion and deflocculation occur through electrostatic, electro steric, or steric stabilization. For example, suitable dispersants may include, but are not limited to, hydrochloric acid, citric acid, diammonium citrate, triammonium citrate, polycitrate, polyethyleneimine, polyacrylic acid, polymethacrylic acid, polymethacrylate, polyethylene glycols, polyvinyl alcohol, polyvinyl pyrillidone, carbonic acid, and various polymers and salts thereof. These materials may be purchased commercially or prepared with well-known techniques. Examples of commercially available dispersants include Darvan® 821-A ammonium polyacrylate dispersing agent commercially available from Vanderbilt Minerals, LLC; Dolapix™ CE 64 organic dispersing agent and Dolapix™ PC 75 synthetic polyelectrolyte dispersing agent commercially available from Zschimmer & Schwarz GmbH; and Duramax™ D 3005 ceramic dispersant commercially available from Rohm & Haas Company.

Measured Particle Size: refers generally to measurements obtained by a Brookhaven Instruments Corp. X-ray disk centrifuge analyzer. The communication processes described herein may reduce the measure particle size of the zirconia powder contained in the ceramic slurry from the D(50) to <600 nm, to a range of D(50) equal to 100 nm to 400 nm, such as D(50) equal to 200 nm to 300 nm. In some aspects, zirconia powders can have a measured particle size D(50) of 100 nm or less. The comminution process described herein may be used to reduce the measured particle size of the zirconia powder contained in the slurry from the D(50)<100 nm, to a range of D(50) equal to 20 nm to 90 nm, such as D(50) equal to 30 nm to 70 nm. In particular aspects disclosed herein, nano powders are mixed with submicron powders, such as in comminution process described herein to get a mixed a powder with a D(5)<200 nm, to a range of D(50) equal to 20 nm to 180 nm, such as D(50) equal to 40 nm to 100 nm.

An apparatus, system, and method are provided for pressure casting parts having irregular shapes using an indirect feed and a modular mold with even surfaces and no cracking. Moreover, the apparatus, system, and method disclosed herein allows for facile handling and movement, which can further be automated. Thus, unlike traditional pressure casting parts, the apparatus and system disclosed herein is much lighter and less cumbersome to move and clean. Additionally, unlike traditional pressure casting molds, which cast large parts, the present disclosure can cast smaller cast bodies such as, but not limited to, less than 250 mm in diameter, less than 125 mm×125 mm; preferably 180 mm in diameter, less than 75 mm×75 mm; and more preferably less than 100 mm diameter, less than 50 mm×2 mm. Accordingly, the present disclosure also allows for a batch of small parts having a geometrical shape such as, but not limited to, circle, square, triangle, etc. to be produced in an insert within a cavity.

In some aspects, a manifold can be removably coupled to one or more molds comprising a cavity for indirectly receiving ceramic slurry, the mold having an impermeable surface and the manifold comprising or more feed holes configured to directly deliver ceramic slurry to an exterior portion of the impermeable surface, wherein the ceramic slurry flows into the cavity of the mold after ceramic slurry is delivered to the exterior portion of the impermeable surface of the mold. Accordingly, ceramic slurry delivers and/or pools ceramic slurry at an exterior portion of each mold and indirectly fed to a cavity of a mold at a much lower force resulting in a desirable cast body.

As illustrated by FIG. 1, a mold 10 can be positioned between a porous membrane 12 and a manifold 14 such that one or more feed holes 16 may inject ceramic slurry directly to an exterior portion of the impermeable surface of the mold 10 so that the ceramic slurry indirectly flows into the cavity 18 of the one or more molds, wherein ceramic particles are deposited onto the porous membrane 12. In particular aspects of the present disclosure, the porous casting substrate may comprise at least one porous material such as, but not limited to, plaster, for example, gypsum, or a porous plastic such as hydroxypropyl cellulose, or copolymers of acrylic acid and methacrylic acid, and the like. The casting preferably has sufficient rigidity to maintain the cavity shape during the casting process. In some aspects, the porous casting substrate may comprise a filter paper, cloth, or membrane backed by a supporting structure or material, such as, but not limited to, a metal filter.

In some aspects, the one or more feed holes 16 can be aligned with the exterior portion of a bottom portion 20 of the mold that is defined by the thickness of the mold 10 and wherein ceramic slurry is directly injected into. In some aspects, a gap 22 is provided between the bottom portion 20 of impermeable mold 10 and the manifold 14. Moreover, the gap 22 is in communication with the cavity 20 of the removably coupled mold 10 to allow ceramic slurry to indirectly flow from the gap 22 and cascade into the cavity 20. In particular aspects disclosed herein, ceramic slurry can be pooled at the gap 22 and then indirectly provided into the cavity 20 of the mold 10. For example, after ceramic slurry is directly injected into the exterior surface 22 of the bottom portion 24 of the mold 10, the ceramic slurry is then pooled at the gap 22 and subsequently cascades into mold cavity 20 at a much lower force than the force of the directly injected ceramic slurry via the feed hole 16.

In aspects disclosed herein, the manifold may comprise one or more wells having a first open end and a second closed end comprising or more feed holes. In particular aspects disclosed herein, the one or more feed holes are disposed at an end portion of the one or more wells that enable the one or more feed holes to align with an exterior portion of the one or more molds when removably coupled to the manifold. In certain aspects, the second closed end of the well may further comprise a pitch and thus the second closed end can form a conical shape at a center portion that slopes downwards towards the circumference or perimeter of the well. Furthermore, the pitch is sufficiently sloped to enable excess ceramic slurry to flow downwards towards the circumference or perimeter of the well into the one or more feed hole and into one or more channel of the manifold. In view of this excess ceramic slurry can be recycled into a holding tank for subsequent runs. In certain aspects, a vacuum can be configured to provide a negative pressure and facilitate an expedite the draining process.

Figure 2:
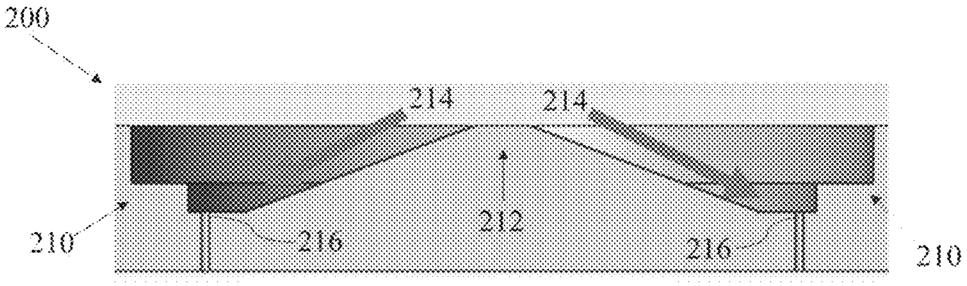
FIG. 2 is a schematic illustrating an aspect of the apparatus according to the present disclosure comprising a manifold that is configured for recycling excess ceramic slurry via a pitch.

FIG. 2 is an illustration depicting a well 200 comprising a center portion having a higher elevation that slopes downwards towards the end portions/circumference 210 of the well 200 and thereby form a pitch 212 that can direct excess ceramic slurry 214 into one or more feed holes 216 that are disposed at the end portions/circumference 210 of the closed end of the well 200.

Figure 3:
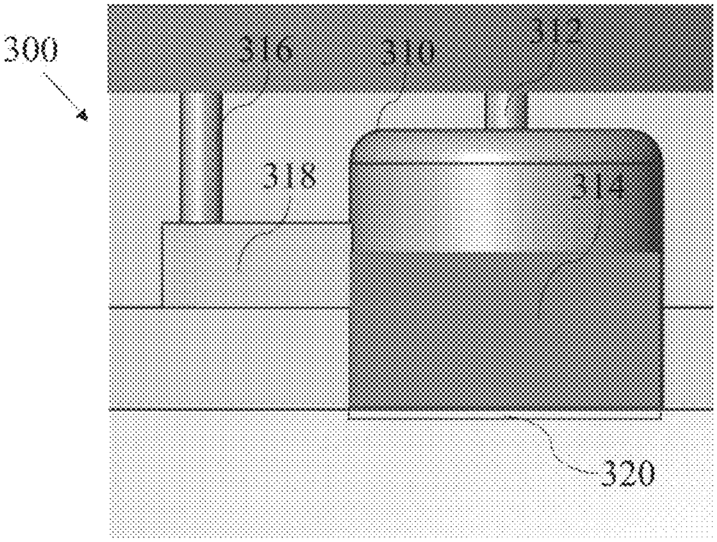
FIG. 3 is a schematic illustrating an aspect of the apparatus according to the present disclosure comprising a manifold that is removably coupled to a mold comprising a cavity and an insert for casting a second cast body onto a first cast body.

In particular aspects disclosed herein, one or more molds may further comprise an insert to form one or more chamber and/or passages within a mold cavity. In some aspects, the one or more chambers and/or passages can be configured for producing one or more cast bodies of similar or different dimensions and/or of same or different shapes. For example, as illustrated by FIG. 3, a mold cavity 300 may comprise an insert 310 that forms a first passage 312 that is in communication with a first chamber 314 and a second passage 316 in communication with a second chamber 318. Thus, ceramic slurry is indirectly fed into the first chamber 314 via first passage 312 and ceramic slurry is indirectly fed into the second chamber 318 via the second passage 316. After all the components are filled with ceramic slurry, pressure can be applied to the first chamber to form a first cast body. After the first cast body is produced, the first cast body can operate as a porous surface such that when pressure is applied to the second chamber 318 filled with ceramic slurry such that the liquid component of the ceramic slurry flows through the first cast body and through the porous membrane 320 and leaving the ceramic particles to produce the second cast body.

Figure 4:
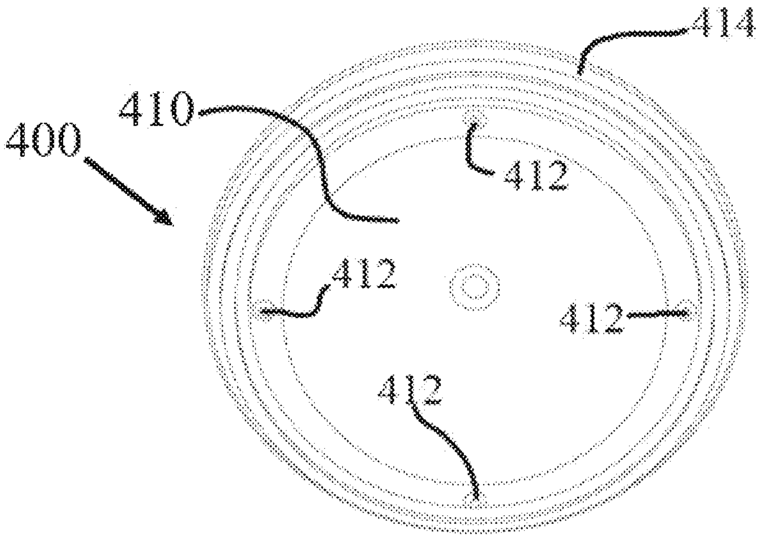
FIG. 4 is an image of an aspect of a well according to the present disclosure comprising a plurality of feed holes and a securing mechanism at an end portion.

In some aspects, the manifold typically comprises a well 400 having a first end that is open and an opposite second closed end enclosed by a wall 410 as shown in FIG. 4. The end portions of the well may comprise one more feed holes 412 configured to directly inject ceramic slurry into an exterior portion of the one or more molds. In certain aspects, the feed holes are typically disposed below a bottom portion of the one or more molds that is formed by the thickness of the mold. Furthermore, the well 400 may comprise a securing mechanism 414 for removably coupling the one or more molds as shown in FIG. 4 such as, but not limited to, one or more ridges, threads, compression or frictions fits, snaps, pin engagements, interferences, magnets, or any securing mechanism commonly known by those skilled in the art.

In certain aspects, the manifold may comprise one or more channels in communication with the one or more feed holes. The one or more channels can provide ceramic slurry to the one or more feed holes. The one or more channels can be removably connected to a holding tank via one or more lines/hoses. In certain aspects, the one or more channels can be removably connected to a pump, a bladder tank, a vacuum, or a combination thereof.

In aspects disclosed herein, the ceramic slurry dispensed into the one or more molds can be cast at a pressure range from greater than 0 bar to 60 bar, preferably from 10 bar to 50 bar, and most preferably from 30 bar to 40 bar. Devices for casting the ceramic slurry under pressure include, but are not limited to, commercially available pressure casting machines for casting ceramics, a collapsible bladder, a pressure pot coupled to an air condenser, a vacuum applied to the porous mold to aid the removal of the liquid component of ceramic slurry.

In one implementation, after the ceramic slurry is dispensed to all the components of the apparatus and connected to a collapsible bladder or similar device, pressure can be applied to the outside surface of the bladder by a hydraulic fluid and thereby apply pressure to the ceramic slurry and force the liquid components of the ceramic slurry through the porous membrane to produce a cast body. Alternatively, the pressure required to produce the desired cast body can be supplied a positive displacement pump or by the head pressure of the ceramic slurry itself. Therefore, when pressure is applied, the porous membrane and/or the porous casting body inhibit the movement of the ceramic particles into the pore volume of the porous membrane and/or porous casting body allowing for the removal of liquid component of the slurry and thereby consolidating ceramic particles forming a cast body within the mold cavity.

In some aspects, the manifold may comprise a pitch for draining excess slurry. In particular disclosed aspects of the present disclosure, the excess ceramic slurry can be routed to a ceramic slurry holding tank for reuse. In some aspects, a positive pressure application and/or a vacuum can be applied to remove excess ceramic slurry and rerouted into a ceramic slurry holding tank. For example, a vacuum can be applied and delivered via one or more hosing, fittings, nozzles, and the like, that align with one or more channels of the manifold.

In certain aspects, sealing elements such as, but not limited to, O-rings can be provided between the manifold and the bottom end of the removably coupled mold. Additionally, sealing elements, such as but not limited to, O-rings can be provided between the porous membrane and the one or more molds. Furthermore, the sealing element, such as, but not limited to, O-rings, can be provided between the insert and the porous membrane.

In aspects disclosed herein, the one or molds have an impermeable surface, wherein the impermeable surface at a fixed distance joins a first open end to a second open end.

Figure 5:
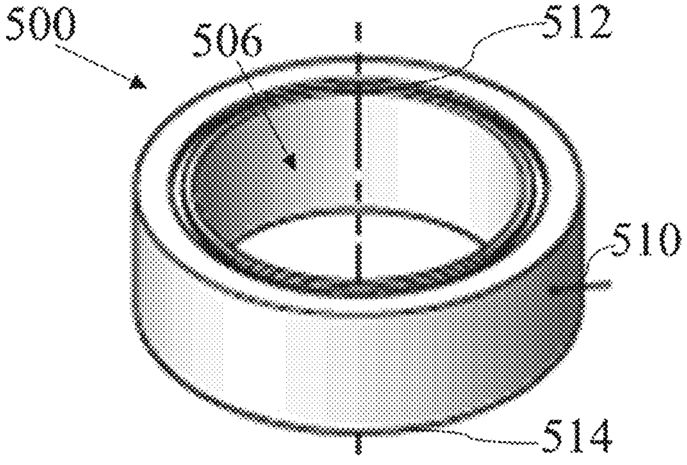
FIG. 5 is an illustration of an aspect of a mold according to the present disclosure comprising a cavity and a first open end and a second open that are joined by an impermeable surface.

For example, as illustrated by FIG. 5, a mold 500 may comprise a first open end and a second open end joined by a curved surface 510 to form a hallow cylinder comprising a circular open first end 512, circular open second end 514, and a cavity 506. In some aspects, the mold is impermeable to both the liquid and solid components of the ceramic slurry under pressure casting conditions, throughout the casting process.

In certain aspects, the mold can have an inner diameter in the range of from greater than 0 millimeters (mm) to 600 mm, preferably from 20 mm to 300, and more preferably from 50 mm to 150 mm. In some aspects, the mold can have a height in the range of from greater than 0 mm to 100 mm, preferably from 5 mm to 70 mm, and more preferably from 10 mm to 50 mm. In aspects disclosed herein, the mold can have a thickness of from greater than 0 mm to 60 mm, preferably from 10 mm to 45 mm, more preferably from 15 mm to 35 mm.

Figure 6:
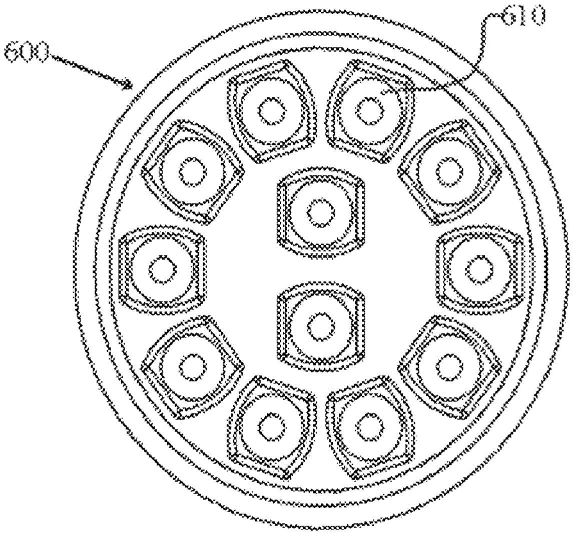
FIG. 6 is an illustration of an aspect of an insert according to the present disclosure comprising a plurality of passages for forming a second cast body.
Figure 7:
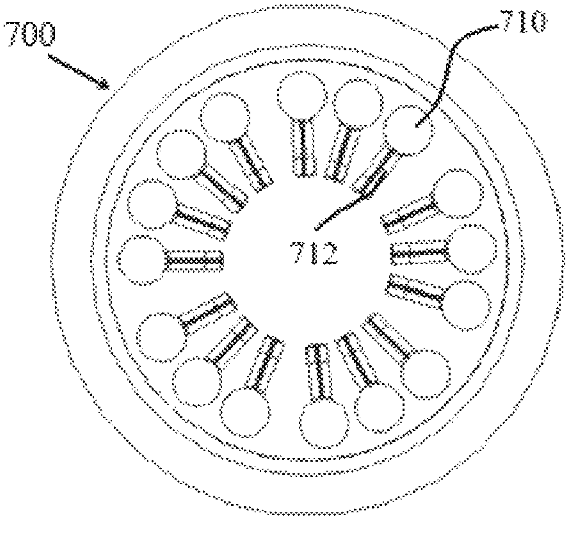
FIG. 7 is an illustration of an aspect of an insert according to the present disclosure comprising a plurality of passages for forming a second cast body.

In particular aspects disclosed herein, the molds can comprise respective inserts extending across the molds to further partition and define the mold cavity into passages and/or additional cavities to produce cast bodies of different shapes and thickness. The mold may comprise an insert comprising one or more chambers and/or passages. In one example, one or more inserts may comprise a plurality of chambers. For example, as illustrated by FIG. 6, the mold cavity may comprise an insert 600 comprising one or more chambers 610 for producing a cast body having smaller dimensions or having an irregular shape. In another example, as illustrated by FIG. 7, the mold cavity may comprise an insert 700 comprising a first passage (not shown) in communication with a first chamber 710 and a second passage (not shown) in communication with a second chamber 712, wherein the second chamber 712 is in communication with the first chamber 710. As previously discussed, the first chamber can produce a first cast body that can be used as a porous surface to produce a second cast body resulting in an overall mallet shaped cast body.

The mold and/or inserts can comprise a material suitable for resisting penetration of the liquid or solid components of the ceramic slurry during pressure casting process while maintaining dimensional stability of the mold cavity. Suitable materials include, but are not limited to, polytetrafluoroethylene, alumina, acetyl plastic, and the like. In some aspects of the present disclosure, the mold comprises a rigid, monolithic structure wherein a solid block of material, such as plastic is milled to form the cavities.

Lubricants may be applied to one or more surfaces of the mold cavity. For example, lubricants that are at least partially insoluble under casting conditions, such as, but not limited to, petroleum jelly, oleic acid, and the like.

Figure 8A:
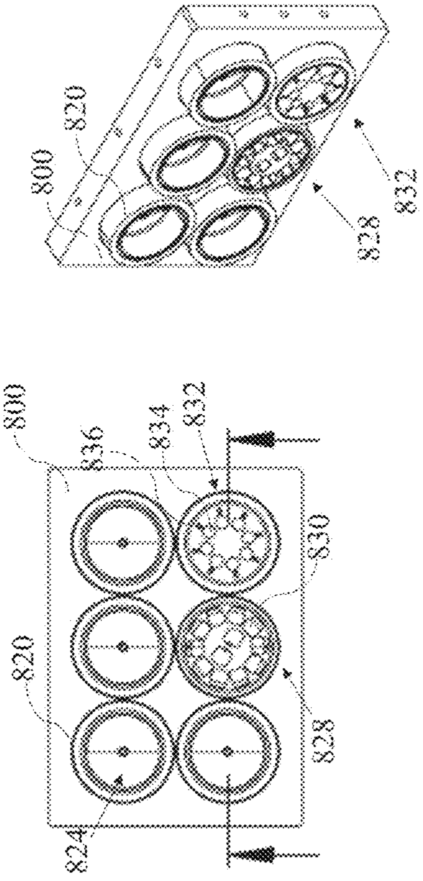
FIG. 8A is an illustration of an aspect of a manifold removably coupled to a plurality of molds according to the present disclosure.
Figure 8B:
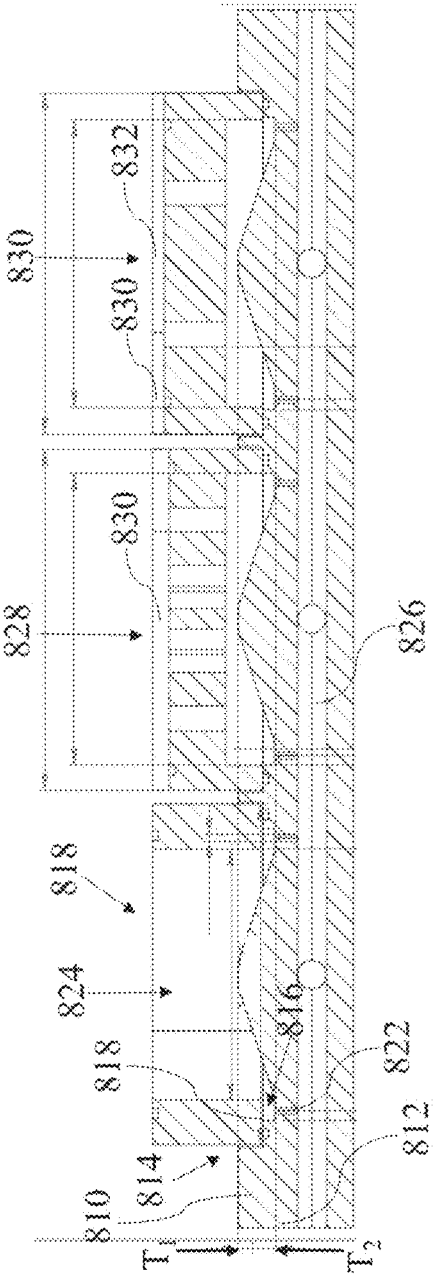
FIG. 8B is a schematic side view of FIG. 8A illustrating an aspect of a manifold removably coupled to a plurality of molds.

As illustrated by FIG. 8B, the manifold 800 may comprise a top portion 810 and a lower portion 812 together defining the length/thickness of the manifold 800. $T_1$ represents the thickness/height of the top portion 810 of the manifold 800, which defines the depth of the corresponding one or more wells 814 in the manifold 800, with one end of the wells being open and the opposite end being enclosed by a rear wall. Therefore, $T_1$ has a sufficient length to removably secure one or more molds disclosed herein.

In some aspects, the top portion of the manifold can comprise a raised surface that forms an edge to provide a gap 816 between the bottom portion 818 of the removably coupled mold 820 and the manifold 800 when assembled. One or more feed holes 822 are provided below the one or more molds 818 as depicted by FIG. 8B. Thus, the feed hole 822 is configured to directly inject ceramic slurry onto the exterior surface of the bottom portion 818 of the mold and pooled in the gap 816 then subsequently indirectly flows into the cavity 824 of the mold 820 at lower pressure than the pressure at which the ceramic slurry was directed injected onto the exterior surface of the bottom portion 816 of the mold 820.

With reference to FIG. 8B, $T_2$ represents the length of the second or lower portion 812 of the manifold 800 comprising the feed hole 822 disposed in the rear wall of the well. The one or more feed holes 822 can be in communication with at least one channel 826 through the thickness of the lower portion 812 of the manifold 800. As shown in FIG. 8B, the one or more feed holes 822 can overlay the channel 826. In some aspects, a hose/line can be attached to the at least one channel 826 and configured for delivering ceramic slurry to the at least one channel 826 of manifold 800. Additionally, the channel 826 can be configured to receive ceramic slurry from a suitable reservoir or storage tank via the hose/line or can be configured to extract excess ceramic slurry after casting runs.

As illustrated by FIG. 8A, a mold 820 can be removably coupled to the manifold 800 to produce a cast body in the shape of a large disc within the cavity 824 of the mold 820. In certain aspects, as depicted by FIG. 8A, the one or more molds can comprise an insert 828 to produce cast bodies of different dimensions and/or irregular shapes in the one or more chambers 830 of the insert 828. Additionally, the one or more molds can comprise an insert 832 having a first chamber 834 and a second chamber 836 to produce a mallet shaped overall cast body.

Figure 9:
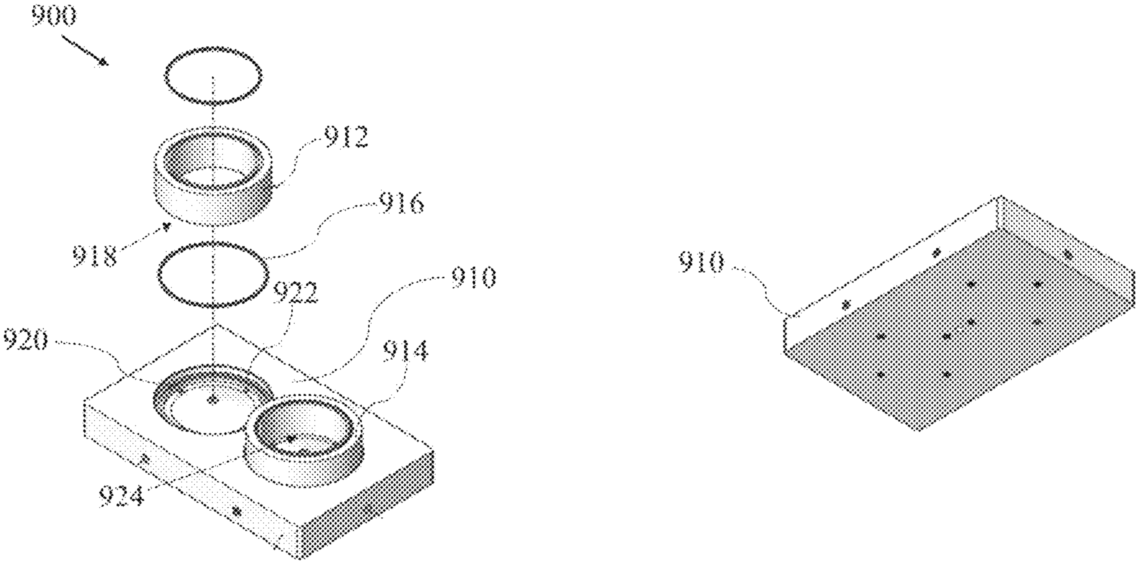
FIG. 9 is an illustration of an exploded view of an aspect of an apparatus according to the present disclosure comprising a manifold removably coupled to two molds configured for indirectly delivering ceramic slurry.
Figure 10:
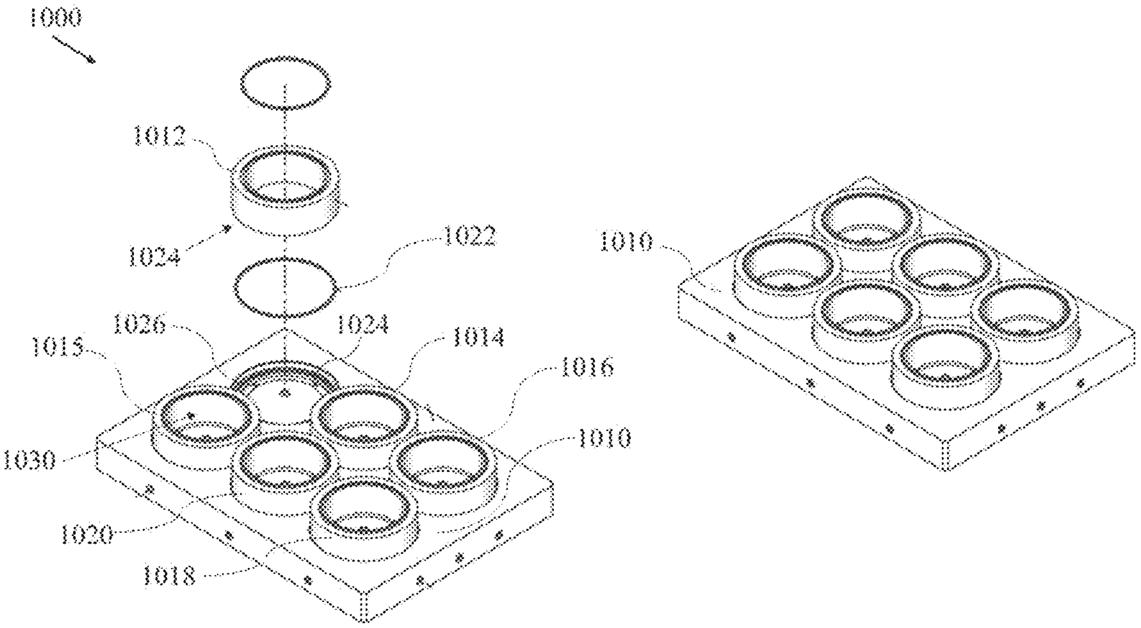
FIG. 10 is an illustration of an exploded view of an aspect of an apparatus according to the present disclosure comprising a manifold removably coupled to six molds configured for indirectly delivering ceramic slurry.
Figure 11:
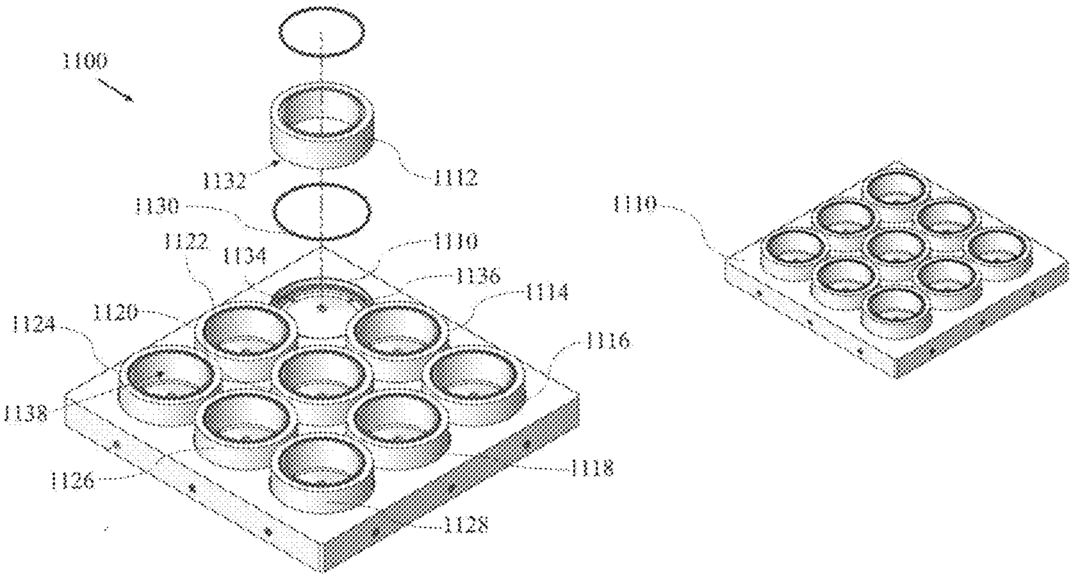
FIG. 11 is an illustration of an exploded view of an aspect of an apparatus according to the present disclosure comprising a manifold removably coupled to nine molds configured for indirectly delivering ceramic slurry.

The mold cavity can have any desirable geometrical shape and thus can produce cast bodies comprising a square, rectangular, disc, triangular, or mallet shape. In one example, as shown in FIG. 9, the apparatus 900 disclosed herein may comprise a manifold 910 that is removably coupled to a first mold 912 and a second mold 914 and sealed via an O-ring 916, wherein the bottom portion 918 of the exterior surface of the first mold 912 and second mold 914 is provided above a first feed hole 920, a second feed hole 922, a third feed hole (not shown), and a fourth feed hole (not shown). Therefore, the feed holes directly inject ceramic slurry into the bottom portion 916 of the exterior surface, which is then indirectly fed in the cavity 924 of the first mold and second mold. In another example, as shown in FIG. 10, the apparatus 1000 disclosed herein may comprise a manifold 1010 that is removably coupled to a first mold 1012, a second mold 1014, a third mold 1015, a fourth mold 1016, a fifth mold 1018, and a sixth mold 1020, which are sealed via an O-ring 1022, wherein the bottom portion 1024 of the exterior surface of the first mold 1012, second mold 1014, third mold, fourth mold 1016, fifth mold 1018, and sixth mold 1020 are provided above a first feed hole 1026, a second feed hole 1028, a third feed hole (not shown), and a fourth feed hole (not shown). Therefore, the feed holes directly inject ceramic slurry into the bottom portion 1024 of the exterior surface, which is then indirectly fed into the cavity 1030 of the molds. In yet another example, as shown in FIG. 11, the apparatus 1100 disclosed herein may comprise a manifold 1110 that is removably coupled to a first mold 1112, a second mold 1114, a third mold 1116, a fourth mold 1118, a fifth mold 1120, a sixth mold 1122, a seventh mold 1124, an eighth mold 1126, and a ninth mold 1128, which are sealed via an O-ring 1130, and wherein the bottom portion 1132 of the exterior surface of the first mold 1112, second mold 1114, third mold 1116, fourth mold 1118, fifth mold 1120, sixth mold 1122, seventh mold 1124, eighth mold 1126, and ninth mold 1128, which are provided above a first feed hole 1134, a second feed hole 1136, a third feed hole (not shown), and a fourth feed hole (not shown). Therefore, the feed holes directly inject ceramic slurry into the bottom portion 1132 of the exterior surface, which is then indirectly fed into the cavity 1138 of the molds.

Figure 12:
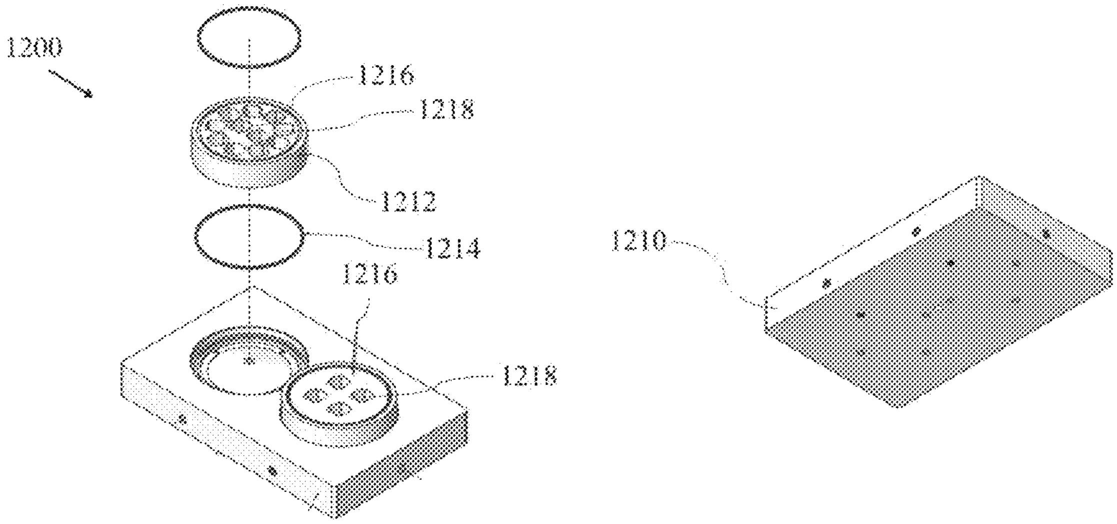
FIG. 12 is an illustration of an exploded view of an aspect of an apparatus according to the present disclosure comprising a manifold removably coupled to two molds, wherein each mold further comprises an insert.
Figure 13:
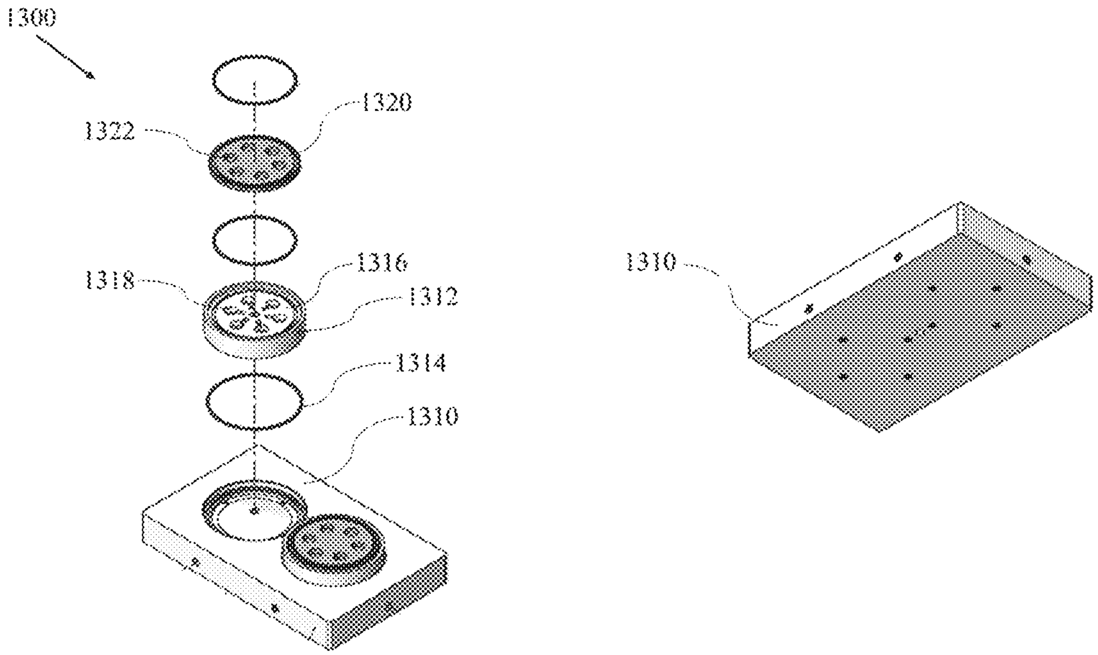
FIG. 13 is an illustration of an exploded view of an aspect of an apparatus according to the present disclosure comprising a manifold removably coupled to two molds, wherein each mold further comprises a first insert and a second insert.

In certain aspects, the mold cavity may further comprise an insert comprising one or more passages and one or more chambers, which can have any desirable geometrical shape and thus can produce cast bodies comprising a square, rectangular, disc, triangular, or mallet shape. In one example, as shown in FIG. 12, the apparatus 1200 disclosed herein may comprise a manifold 1210 removably coupled to a mold 1212 that is sealed via an O-ring 1214, and wherein the mold cavity further comprises an insert 1216 having one or more chambers 1218 that form rectangular shaped blocks. In another example, as depicted in FIG. 13, the apparatus disclosed herein may comprise a manifold 1310 removably coupled to a mold 1312 that is sealed via an O-ring 1314, and wherein the mold cavity further comprises a first insert 1316 having one or more chambers 1318 and a second insert 1320 having one or more chambers 1322 to form an overall cast body having a mallet shape.

In some aspects, the porous casting substrate comprises a median pore diameter that is sufficiently small to inhibit the movement of ceramic particles into the port volume of the casting substrate. Ceramic particles form a layer on the porous casting substrate and continue to build in thickness, as liquid from the ceramic slurry is removed by passing through ceramic particles into the porous casting substrate. In particular aspects of the present disclosure, the porous casting substrate can have a submicron median pore diameter. For example, the median pore diameter can be less than 3 μm, such as less than 1 μm, or between 0.1 μm and 0.6 μm. In some aspects, the ratio of the median pore diameter of the casting substrate to median particle size of the ceramic component can be from 10:1 to 1:1; such as from 5:1 to 1:5.

Also disclosed herein is a method for pressure casting using an indirect feed. In some aspects, the method comprises providing an apparatus comprising a manifold comprising one or more feed holes in direct communication with one or more channels, and the manifold removably coupled to one or more molds comprising a cavity, a first open end and a second open end joined by a surface, wherein a bottom portion of the surface is configured to rest on top of the one or more feed holes, and wherein a porous membrane is removably attached to the first open end of the mold; providing a ceramic slurry, wherein the cavity is indirectly filled with the ceramic slurry after the feed hole directly delivers ceramic slurry to an exterior bottom portion of the surface; indirectly filling the cavity; directly filling channels with the ceramic slurry; applying a pressure to the ceramic slurry to remove a liquid component of the ceramic slurry via the porous membrane and consolidate ceramic particles to form a cast body within the cavity of the removably coupled mold; and ejecting the removably coupled mold comprising the cast body.

The rate at which pressure is applied provides a residence time sufficient to form a cast body of a desired thickness. The required pressure depends on many factors such as, but not limited to, the solids loading profile of the ceramic slurry as it solidifies, the distance traveled by the ceramic slurry from the storage tank and into a mold cavity, and the desired thickness of the cast body.

In some aspects, a pressure range of from greater than 0 bar to 60 bar, such as from 2 bar to 50 bar, preferably from 10 bar to 50 bar or 10 to 20 bar, and most preferably from 30 bar to 40 bar or 30 bar to 35 bar can be applied to consolidate the ceramic particles and form the cast body within the cavity of the mold. In aspects disclosed herein, the pressure is applied during a time range of from greater than 0 minutes to 300 minutes, such as from 60 minutes to 300 minutes, preferably from 20 minutes to 150 minutes, and more preferably from 40 minutes to 120 minutes. In certain aspects, a cast body can be produced in a time range of greater than 5 minutes to 200 minutes, preferably from 20 minutes to 150 minutes or from 25 minutes to 100 minutes, and more preferably from 40 minutes to 100 minutes. In some aspects, the method can produce cast bodies having a thickness ranging from greater than 0 mm to 60 mm, such as from 5 mm to 60 mm, preferably from 10 mm to 45 mm, and more preferably from 15 mm to 35 mm. In one implementation, a cast body having a thickness of 16 mm was produced in 45 minutes at a pressure of 45 bar. In another implementation, a cast body having a thickness of 20 mm was produced in 60 minutes at a pressure of 30 bar. In yet another implementation, a cast body having a thickness of 30 mm was produced in 90 minutes at a pressure of 30 bar.

In certain aspects, the method may further comprise providing an insert into the one or more molds to produce cast bodies within the one or more chambers of the one of more inserts. For example, a main cast bodies having a height ranging from greater than 0 mm to 250 mm, preferably from greater than 0 mm to 150 mm, more preferably from greater than 0 mm to 100 mm; and a stem length ranging from greater than 0 mm to 25 mm, preferably from 5 mm to 20 mm, and more preferably from 5 mm to 15 mm are produced. The main cast bodies can be produced in a time range of from 10 minutes to 150 minutes, preferably from 60 minutes to 100 minutes, and more preferably from 70 minutes to 90 minutes; and the stem cast bodies are produced in a time range of from 50 minutes to 150 minutes, preferably from 60 minutes to 130 minutes, and more preferably from 70 minutes to 120 minutes. In one implementation, a cast body having a height of 18.5 mm was produced in 80 minutes and a stem length of 12 mm was produced in 105 minutes.

In some aspects, the method may further recycle the unused ceramic slurry after the one or more cast bodies have been produced. In one implementation a vacuum can be configured to the one or more channels to apply a negative pressure and thereby extract the excess slurry into a holding tank.

Figure 14:
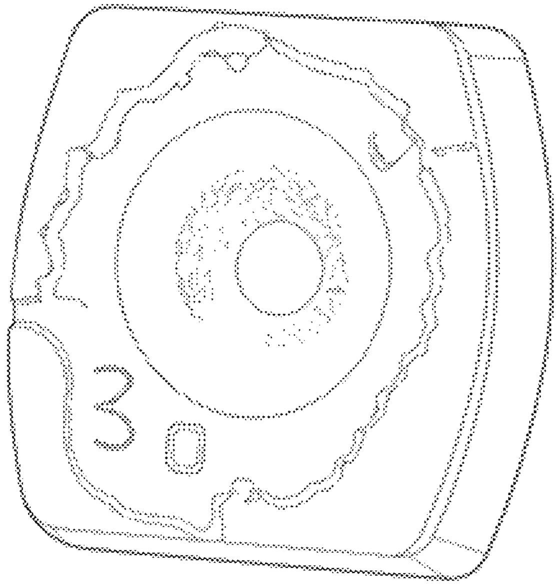
FIG. 14 is an image of a cast body produced using traditional pressure casting devices and methods.
Figure 15:
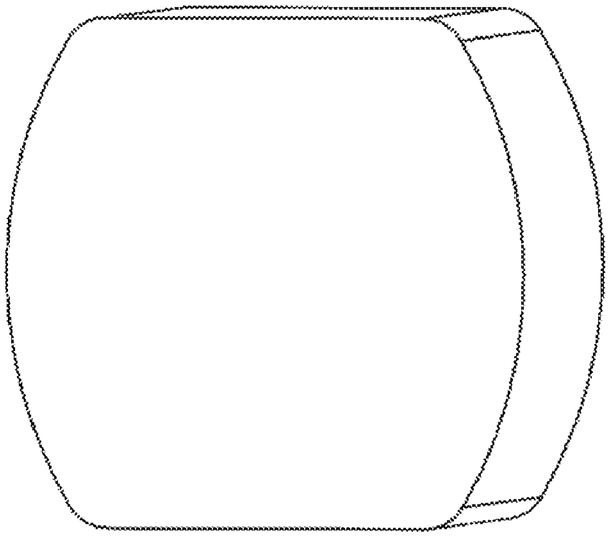
FIG. 15 is an image of a cast body produced according to an aspect of the present disclosure.

In one example, a cast body was produced using the apparatus and method disclosed herein and compared to a cast body produced using traditional pressure casting methods and devices. FIG. 14 shows the cast body produced using traditional pressure casting methods and devices, wherein ceramic slurry was directly injected into the mold cavity. Thus, in view of FIG. 14, the cast body formed using traditional pressure casting methods displayed a cracked cast body with uneven surfaces. FIG. 15 shows the cast body produced using an apparatus and method comprising a manifold removably coupled to a mold, wherein the ceramic slurry was directly injected into an exterior bottom portion of the mold, pooled at the gap between the manifold and mold, and subsequently indirectly fed into the mold cavity at a much lower pressure. In view of FIG. 15, the cast body did not crack and did not exhibit uneven surfaces. Therefore, the apparatus and method disclosed herein produced a more desirable cast body compared to the cast body produced using traditional pressure casting methods and devices.

In view of the many possible aspects to which the principles of the present disclosure may be applied, it should be recognized that the illustrated aspects are only preferred examples of the disclosure and should not be taken as limiting the scope of the present disclosure. Rather, the scope is defined by the following claims. We therefore claim as our invention all that comes within the scope and spirit of these claims.

We claim:

1. A method, comprising:

providing an apparatus comprising a manifold comprising one or more feed holes in direct communication with one or more channels, and the manifold removably coupled to one or more molds comprising a cavity, a first open end and a second open end joined by a surface, wherein a bottom portion of the surface is configured to rest on top of the one or more feed holes, and wherein a porous membrane is removably attached to the first open end of the mold;

providing a ceramic slurry, wherein the cavity is indirectly filled with the ceramic slurry after the feed hole directly delivers ceramic slurry to an exterior bottom portion of the surface;

indirectly filling the cavity;

directly filling channels with the ceramic slurry;

applying a pressure to the ceramic slurry to remove a liquid component of the ceramic slurry via the porous membrane and consolidate ceramic particles to form a cast body within the cavity of the removably coupled mold; and ejecting the removably coupled mold comprising the cast body.

2. The method of claim 1, wherein applying the pressure comprises a range of 2 bar to 50 bar.

3. The method of claim 1, wherein the cast body having a thickness in the range of 5 millimeter to 60 millimeter is produced in a time range of 5 minutes to 200 minutes.

4. The method of claim 1, further comprising providing an insert comprising one or more passages into the cavity of the one or more molds, wherein the ceramic slurry is indirectly delivered to the passages, and thereby fills the cavity, the one or more channels, and the one or more passages to produce a stem cast body.

5. The method of claim 1, wherein the cast body has a height in the range of 15 millimeter to 35 millimeter and is produced in a time range of 25 minutes to 100 minutes at 30-35 bar.

6. The method of claim 1, wherein the cast body has a height in the range of 15 millimeter to 35 millimeter and is produced in a time range of 60 minutes to 300 minutes at 10-20 bar.

7. The method of claim 1, further comprising recycling the excess ceramic slurry via a pitch.

8. The method of claim 1, wherein a vacuum is configured to the one or more channels to apply a negative pressure and thereby extract the excess slurry into a holding tank.

* * * * *